F. M. BECKET.
METHOD OF REDUCING ORES.
APPLICATION FILED MAR. 24, 1908.
967,159.
Patented Aug. 16, 1910.
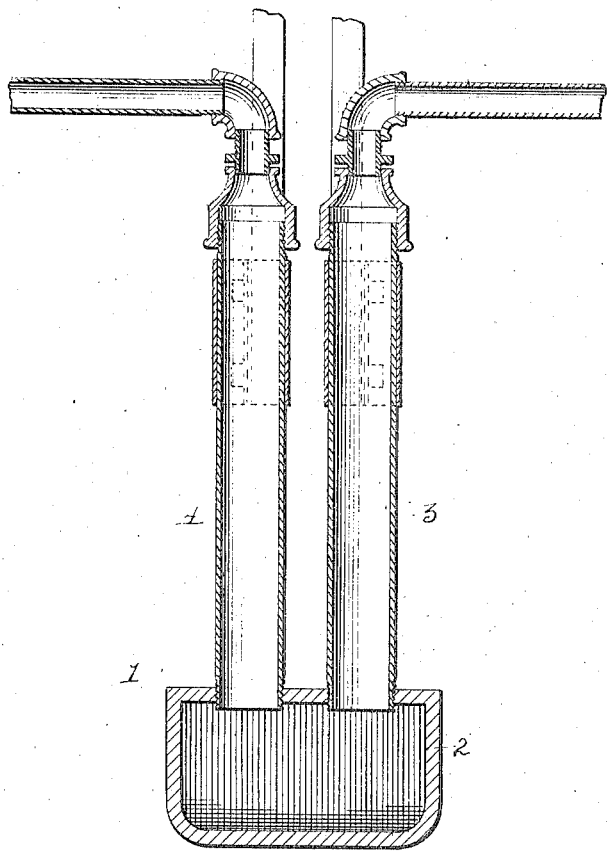

UNITED STATES PATENT OFFICE.

FREDERICK M. BECKET, OF NIAGARA FALLS, NEW YORK, ASSIGNOR TO ELECTRO METALLURGICAL COMPANY, A CORPORATION OF WEST VIRGINIA.

METHOD OF REDUCING ORES.

967,159.        Specification of Letters Patent.        Patented Aug. 16, 1910.

Application filed March 24, 1908. Serial No. 422,985.

*To all whom it may concern:*

Be it known that I, FREDERICK M. BECKET, a subject of the King of Great Britain, residing at Niagara Falls, in the county of Niagara and State of New York, have invented certain new and useful Improvements in Methods of Reducing Ores, of which the following is a specification.

The object of this invention is to provide an electric furnace method of reducing ores, the method being particularly adapted for use in operations wherein it is desirable that the metal or alloy produced should contain a comparatively small proportion of carbon or a practicable minimum thereof.

According to the invention the reduction is effected in a molten bath by means of heat developed by an alternating or direct electric current carried to or from the bath by means of a metallic electrode or electrodes, while cooling the electrode or electrodes to a sufficient extent to prevent substantial melting, corrosion or solution of the metal by the molten bath or the products of the reduction.

In operation the portion of the electrodes immersed in the bath becomes covered or coated with a more or less solid protective coating of the constituents of the bath, this coating being at the temperature employed a conductor of electricity.

In carrying the invention into effect I provide a charge comprising an ore or compound of a refractory metal as chromium, tungsten, molybdenum, vanadium or the like, and a reducing agent. Usually a basic or acid flux adapted to produce a suitably fusible slag is added to the charge, the conditions in all cases being chosen to provide a molten bath in presence of which the reduction occurs. The reducing agent may be carbon, which is preferably used in substantially the proportion required to combine with the oxygen or other non-metallic constituents of the ore, whereby its substantially complete elimination is secured and a metallic product low in carbon is obtained. Or instead of carbon I may employ such other reducing agents as calcium carbid, silicon carbid, silicon or ferro-silicon, according to the ore to be treated and the product sought.

A single water-cooled electrode or a group of such electrodes of common polarity may be employed, the current passing between such electrode or electrodes and the walls of the pot or containing vessel or the metallic product in the vessel; or two electrodes or series of electrodes of opposite polarity may be employed, depending into the molten bath or slag and adjustable therein if desired.

A suitable form of electrode for most reducing operations comprises a hollow block of cast iron provided with connections for the circulation of water or other cooling medium.

An electrode of this character is illustrated in the accompanying drawing wherein the figure is a central vertical section through the block and cooling pipes.

In said figure 1 represents a metal block of size and form adapted to the furnace in which it is to be used, the block having walls 2 of moderate and preferably substantially uniform thickness.

3, 4 represent pipe connections for supply and discharge of a cooling medium, these being of comparatively large size and serving also to support the electrode in the bath and to convey the current to the block 1.

Instead of cast iron I may employ wrought iron; or for special operations wherein it is desired to avoid contamination of the product by iron, other metals as for instance nickel may be used. Where particularly high temperatures are used it is often desirable to employ as electrodes metals or alloys having a higher melting point than iron, such for instance as ferro-titanium.

In operation the rate of supply of the cooling medium and the current density at the surface of the metallic electrode should be so regulated as to provide at the electrode surface a temperature at which a non-fluid protective layer of the constituents of the bath will coat the immersed portion of the electrode, protecting it from the action of the bath or the products of the reduction, while not unduly increasing the resistance to the passage of the electric current.

The reduction of ores or compounds in the electric furnace, particularly for the production of low-carbon ferro-alloys, may also be effected by the use as electrodes of alloys having very high melting points, as for instance alloys containing tungsten, molybdenum or titanium, the ferro-alloys containing high percentages of these metals being particularly suitable. For the above purposes I may also employ other difficultly fusible metallic bodies, as titanium carbid or titanium-iron-carbon alloys. The fusing points of these several metallic bodies are so high that in certain cases wherein they serve as electrodes it is unnecessary to apply special cooling means.

I claim:

1. The method of reducing ores which consists in passing through a molten bath containing a compound of a metal and a reducing agent an electric current carried by a metallic electrode depending into the bath, and cooling said electrode to protect it from the bath and reduction products.

2. The method of reducing ores which consists in passing an electric current through a molten bath containing a compound of a metal and a reducing agent between metallic electrodes of opposite polarity depending into the bath, and cooling said electrodes to protect them from the bath and reduction products.

3. The method of reducing ores which consists in passing through a molten bath containing a compound of a metal and a reducing agent an electric current carried by a metallic electrode depending into the bath, and cooling said electrode sufficiently to maintain on the immersed portion thereof a protective, non-fluid, electrically conductive coating of the constituents of the bath.

4. The method of reducing ores which consists in passing through a molten bath containing a compound of a metal and a reducing agent an electric current carried by a metallic electrode maintained out of contact with the metallic reduction products, said electrode having a melting point substantially higher than that of iron, and cooling said electrode to protect it from the bath and reduction products.

5. The method of reducing ores which consists in passing through a molten bath containing a compound of a metal and a reducing agent an electric current carried by a metallic electrode maintained out of contact with the metallic reduction products, said electrode having a melting point substantially higher than that of iron.

In testimony whereof, I affix my signature in presence of two witnesses.

FREDERICK M. BECKET.

Witnesses:
J. N. DEINHARDT,
DEAN BURGESS.